Jan. 16, 1945.  K. BERGER  2,367,329
EXHIBITING DEVICE FOR SHORT ELECTRICAL IMPULSES
Filed Nov. 24, 1941
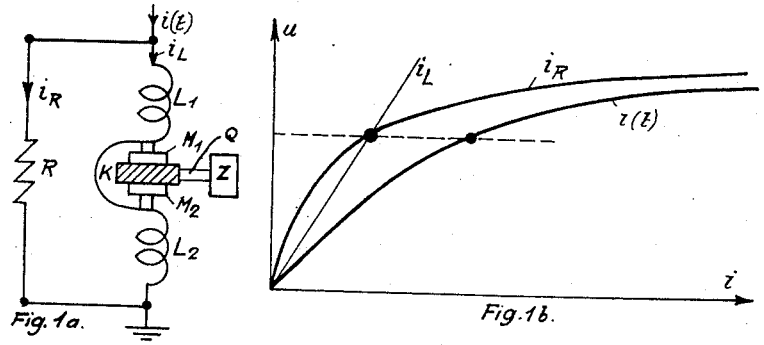
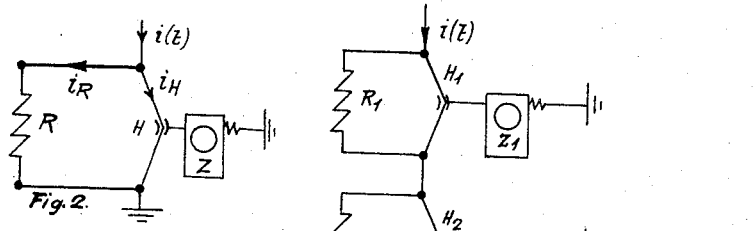
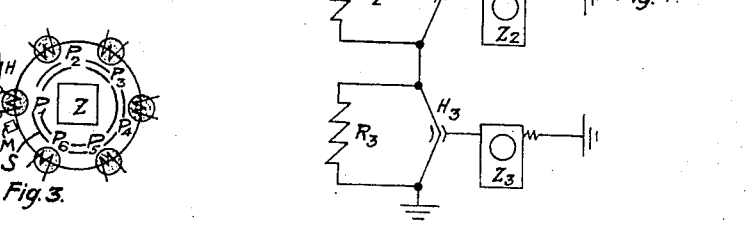
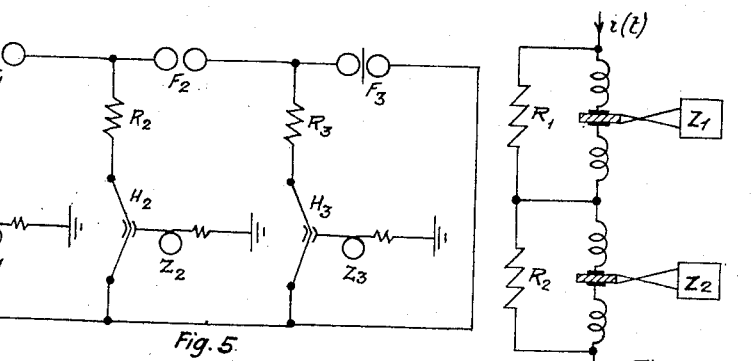
Inventor
Karl Berger
by
Morgan Finnegan Davison
Attorneys Patented Jan. 16, 1945

2,367,329

UNITED STATES PATENT OFFICE 2,367,329

EXHIBITING DEVICE FOR SHORT ELECTRICAL IMPULSES

Karl Berger, Zurich-Zollikon, Switzerland, assignor to Landis & Gyr, Aktiengesellschaft, Zug, Switzerland, a corporation of Switzerland Application November 24, 1941, Serial No. 420,190
In Switzerland August 3, 1940

3 Claims. (Cl. 177—311)

Among the protective devices against disturbances caused by lightning a foremost place is taken today by excess voltage arresters for stations, as such arresters are capable in a very brief moment of time of conducting a large current, i. e., in a so-called current surge into the earth. It has been found that it is very important for the operation of electric power stations to know, when and how often an operatively connected arrester has absorbed such current impulses and of what intensity they were. The counting of the current impulses shows how often the arrester has rendered high-voltage harmless and the measuring of the magnitude of the arrested current impulses indicates the strain on the arrester. As it is difficult to build arresters capable of withstanding a repeated high stress without damage, it can be inferred on the one hand from the counting how necessary the arrester is, and on the other hand from the measuring whether an arrester has been overstressed in service and ought therefore to be replaced, or else, whether it is still serviceable. Especially in cases of enclosed arresters, inspection of the working parts is hardly possible.

There are well-known devices for counting such current impulses especially in excess voltage arresters which are inserted between the arrester and the earth and with which a current impulse is sent through the parallel connection of a capacity and a voltage-bound (valve-like) resistance. With proper current magnitude a capacity is charged to a voltage corresponding to the valve-like character of the resistance. In the ideal case of a pure valve the capacity remains charged after the current impulse has ceased. The stored-up energy is utilised to actuate an impulse meter connected in parallel to a condenser. With this meter, current impulses of at least $10^{-5}$ seconds (10 micro-seconds) duration and at least a few hundred amperes peak value can be counted. Hitherto this method has not been used for quantitative measuring of the impulse magnitude.

Heretofore, for measuring the peak values of surge currents, small tempered steel wires have been much used which are permanently magnetised by the current to be measured, whereby the magnitude of the magnetising impulse current can be inferred from the intensity of the remanent magnetism. This method is very simple for roughly determining the magnitude of lightning- and impulse currents, but does not tell anything about the values of the current and the magnitude of the applied energy $\int i^{dt}$ resp. $\int i^2 dt$, which are the criterion for the stress on arresters. Moreover, it is impossible in this way to count the current impulses, because after each magnetising a steel wire must be first tested and de-magnetised.

According to the present invention, a characteristic of the present device for counting and measuring short current impulses of about $10^{-6}$ to $10^{-2}$ second duration is that electric surge power is transformed to a non-electric form of power and stored up as such, and, further, that the stored-up power is utilised for actuating counting instruments or measuring instruments or both simultaneously.

My invention will be better understood from the following description and the accompanying drawing where like parts are designated by the same characters of reference and wherein:

Fig. 1a shows an embodiment of my invention for converting very short electrical impulses into measured mechanical movement by electrodynamic compression of a resilient block;

Fig. 1b shows a voltage-current drooping characteristic of a non-linear resistance connected in parallel with the electrodynamic converter of Fig. 1a, to avoid overloading at large values of current;

Fig. 2 shows another embodiment of my invention and converts or transforms short electrical impulses into measured mechanical movement by expanding a wire by heat generated by the current passing therethrough, constituting a hot-wire current meter or electro-thermal impulse meter;

Fig. 3 shows a modified form of electro-thermal meter wherein the electric impulse ignites an explosive charge carrier on a rotatable spider, thereby rotating the spider and bringing the next charge into operating position, and actuating a counter;

Fig. 4 shows a series connected multiple-unit system of the hot-wire current meter type of Fig. 2, the units being respectively adapted to count impulses of different magnitudes;

Fig. 5 shows a parallel connected multiple-unit system of the hot-wire current meter type of Fig. 2, including also individual spark gaps in each unit, and adapted to count separately current impulses of different magnitudes, and Fig. 6 shows a series connected multiple-unit system of the electrodynamic resilient compression type of Fig. 1a, the units having respectively coil elements of different designs responsive to count separately current impulses of different magnitudes.

The nature of the idea of the present invention may be seen from Figs. 1a and 1b. In Fig. 1a, $i(t)$ indicates a very short current impulse to be measured, $L_1$ and $L_2$ are two magnetically closely linked choke coils which attract each other owing to the passage of current $i_L$. The impulse of the attracting forces imparts a corresponding acceleration to the masses $M_1$ and $M_2$ attached to the adjacent ends of the coils $L_1$ and $L_2$. The kinetic energy stored in the masses $M_1$ and $M_2$ is now utilised to actuate the exhibitor Z on the one hand, and on the other to compress the elastic intermediate piece K. This exhibitor may be an indicator, a register, or a recorder. When elastic intermediate piece K is compressed between masses $M_1$ and $M_2$, it extrudes laterally a distance depending on the extent of the compression and acts upon an actuating element of exhibitor Z positioned in engaging relation thereto.

One difficulty in the design of such exhibitors consists in the fact, that current impulses of different magnitude, as they occur in arresters, yield impulses and forces in the two coils of very different magnitude. As the force due to the current is substantially proportionate to $i^2$, the power generated with 32-fold current becomes 1000 times greater and correspondingly, with the same duration of current, also the mechanical energy $J - \int K dt = a \int i^2 dt$, where $k$ is the mechanical power, or energy per unit time, and $a$ is a constant. In order to overcome this difficulty, a non-linear resistance R is connected parallel to the energy transforming elements $L_1$, $L_2$, as used for arresters, such for instance as the material "Thyrite," described in McEachron U. S. Patent No. 1,922,742. The characteristic of this resistance may be seen in Fig. 1b. As the current in the resistance increases much more rapidly than the terminal voltage $(u)$, that is, the magnitude of the resistance decreases as the current increases, this causes inversely a slower increase of the current $i_L$ through the inductance $L_1$ of the terminal voltage $(u)$ and the total current $i(t)$. By choosing suitable characteristics of the resistances R and of the coil inductance $L_1$, $L_2$, with a 30-fold current $i(t)$, only about 30-fold value of the mechanical impulse or force is obtained, or even less. The amount of energy transformed into mechanical energy can be limited in such a way that it just suffices reliably to actuate a mechanical exhibiting instrument or meter Z through elastic intermediate piece K. The voltage $(u)$ across the energy transforming element and across the valve-like resistance R can be kept so small that it does not influence the protective value of the arrester connected in series. If the resistance R is designed with suitably greater current rating than the arrester, the meter will not be damaged, even with overstress of the arrester. This arrangement can be defined as an electro-dynamic meter.

In the specification and claims, I mean by the words "exhibit" and "exhibitor" to include generically instruments which count number of impulses, measure magnitude of impulses, and indicate, register, and record the same.

A second example of the invention is shown in Fig. 2. Here the electric current impulse $i(t)$ to be exhibited is delivered to the energy transforming element H which transforms the electric impulse energy into thermal energy, thereby storing it up for a short time. The element H may be of the type of the hot wire used in a hot wire ammeter and may be operatively associated with the exhibiting means in a manner similar to that employed in a hot-wire ammeter. The temporary extension of the heating element H due to the passage of current $i_H$ is exhibited by a meter of considerable inertia, for which a spring F with considerable opposing force is used. The effect of this device is that of a ballistic hot-wire current meter; it may be defined as an electro-thermal impulse meter.

As long as the electric resistance of the heating element H remains constant, its produced heat is proportionate to $\int i^2 dt$ as with the electro-dynamic impulse meter. Consequently there exists the same difficulty with regard to the application of the device for counting current impulses of widely different magnitudes. In order to prevent too intense heating in cases of heavy impulses, i. e., for regulation or limitation of the sensitiveness of the meter at the top of the scale, also in this case a valve-like resistance R in parallel connection is suitable. By a similarly formed voltage-current characteristic $u(i)$ as in Fig. 1b, the heating resistance R can be protected from overload and, in addition, the meter suffers no damage even with overload of the arrester connected in series.

The diminution of the sensitiveness of the measuring element may also be obtained in a less perfect way by utilizing instead of the valve-like resistance a spark gap with series resistance. When the spark gap becomes conductive the resistance becomes connected in parallel to the heating element H, which thus receives only a fraction of the total current, causing an abrupt diminution of the sensitiveness.

If only very small impulses are to be counted, the resistance R in Figs. 1 and 2 can be replaced by a condenser. First, this condenser stores up electric energy and conveys it at once to the transforming element $L_1$, $L_2$ or H. In order not to overload the device in cases of very heavy impulses, it is advisable also to use a valve-like resistance R in parallel to the storage condenser C.

The elements of the above valve-like resistance R are the same as those commonly used in over voltage arresters or breakers, as shown for instance in McEachron U. S. Patent No. 1,822,742 above mentioned. The right-hand current branch in Figs. 1 and 2 can also be connected directly in parallel to a part of the arrester by providing the latter, for instance, with a tap for the meter.

In addition, a special design of the electro-thermal meter is shown in Fig. 3. Here the heat energy which appears in the energy transforming element H serves to ignite a small quantity of explosive substance $P_1$ which may be powder, by applying heat thereto. The heating element H may be a hot wire element mounted close to explosive unit $P_1$ and igniting the latter by radiant heat. In a conductive arrangement, the element H may be cut between points $A_1$ and $A_2$ and the terminals of the fuse of explosive cartridge $P_1$ may be arranged to make connection respectively with points $A_1$ and $A_2$. The liberated energy enables signals to be given or any mechanical meter to be actuated, whereby only an extremely small amount of energy is required for the release. In order to prepare the device again immediately after registration for further counting, a new shot-firing fuse $P_2$ is conveyed in about 0.1 second in place of the former one. This may be brought about, for instance, by spring pressure of a spiral spring S driving a spider, as indicated in Fig. 3, and the impact of the explosion releases the spider for a forward step movement to the position of the next cartridge $P_2$. An exhibitor exhibiting the number of impulses is directly mechanically connected to said spider. A portion of the explosive member $P_1$, etc., which will be blown away, engages a stop M. As modern arresters are only seldom actuated, a small number of spare fuses suffices. The valve-like resistance R provides for a current path to the earth at all times, even if the current of the branch circuit through the striker is temporarily cut off.

Instead of the heating resistance, an electric spark may also be used which is produced in a small flashing length between $A_1$ and $A_2$ owing to the impulse current $i$ (spark striker). The heat developed by the spark also ignites the explosive substance P, thus making available plenty of energy for actuating a counter and even for signaling.

The measuring of the magnitude of current impulses, instead of simple counting, can first be carried out by replacing the counting element of Figs. 1 and 2 by a measuring element. For this purpose only the actuation of the counting drum of the meter has to be made dependent on the magnitude of the transformed impulse energy, so that, for instance, a double step actuation of the counting drum corresponds to a double current impulse, which can be obtained simply by means of a fine jack wheel. As with this arrangement there is no counting of the number of impulses, a counting and measuring element must be actuated simultaneously, the counting drum thereby indicating the number of impulses, the measuring drum the total number of unit impulses, i. e., after division by the number of impulses the average impulse force, or else, the measuring and counting drum must be coupled so that any step actuation advancement of the measuring drum will give an impulse to the counting drum.

The measuring of values of currents of greatly varied magnitude can be carried out by actuating simultaneously several counting movements, constructed on suitable principles, with different degrees of sensitiveness. Fig. 4 gives an example of such a measuring device in which three electrothermal counting elements are connected in series. The first counting movement registers for instance impulses which exceed the value 1, the second those which are over 5 impulse units, the third those which are above 25 impulse units. The reading of the three-figured counting drum enables judgment to be made of the occurrence of the impulse of varied magnitude. The valve-like resistances $R_1$, $R_2$, prevent overloading the more sensitive counting stages.

Fig. 5 shows a multi-stage arrangement, in which the stages do not occur in series connection of individual counting elements, but by parallel connection over small spark gaps $F_1$, $F_2$, $F_3$. A small current impulse heats only the resistance $R_1$, without leading to flashing over the spark gap $F_1$. Meter $Z_1$ counts these impulses. If the impulse is in excess of a certain magnitude, the spark gap $F_1$ becomes responsive, whereby resistance $R_2$ will be connected in parallel. Now also meter $Z_2$ counts, meter $Z_1$ being thereby at the same time protected from overload. If the impulse current still increases, gap $F_3$ also responds, whereby meter $Z_3$ counts, the sensitive resistances $R_1$ and $R_2$ being automatically short-circuited. A final small spark gap provides for a short circuit of the measuring device in cases of overload, whereby a disruption of a thin insulator, for instance paper, serves to signal the occurrence. Instead of spark gaps $F_1$ to $F_3$, gas-filled tubes may also be used.

Also electrodynamic meters can be used in the described manner for measuring impulses by forming chains of network units of different degrees of sensitiveness by means of series or parallel connection. The different degrees of sensitiveness of the network units can be obtained by different values of coil inductance (number of turns) and different distances of coils. Fig. 6 shows such an arrangement of two network units.

Finally it is also possible to actuate several counting movements of different degrees of sensitiveness from one single energy transforming element, by putting for instance in Fig. 2 instead of the single counting movement Z, the meters $Z_1$—$Z_2$—$Z_3$ of different degrees of sensitiveness (for instance 1 to 5 to 25 impulse units).

While I have herein illustrated and described certain preferred embodiment of the present invention, it will be apparent that changes in the design may be made without departing either from the spirit of the invention or the scope of my broader claims.

What I claim is:

1. In an instrument for surge exhibition or measurement, a pair of inductance coil elements connected in series and movably mounted in juxtaposition, an elastic element mounted between said coil elements, said coil elements being adapted to apply mechanical pressure to said elastic element when a current traverses said coil elements, a mechanical movement responsive exhibiting element, and link means connected to said elastic element for transmitting deformations of said elastic element to said mechanical movement responsive element.

2. In an instrument for surge exhibition or measurement, a pair of inductance coil elements connected in series and movably mounted in juxtaposition, an elastic element mounted between said coil elements, said coil elements being adapted to apply mechanical pressure to said elastic element when a current traverses said coil elements, a mechanical movement responsive exhibiting element, link means connected to said elastic element for transmitting deformations of said elastic element to said mechanical movement responsive element, and a non-linear resistance element connected in parallel across the free terminals of said coil elements and whose resistance decreases with increasing values of current therethrough.

3. In an instrument for surge exhibition or measurement, a plurality of exhibiting units connected in series, each of said units comprising a pair of inductance coil elements connected in series and movably mounted in juxtaposition, an elastic element mounted between said coil elements, said coil elements being adapted to apply mechanical pressure to said elastic element when a current traverses said coil elements, a mechanical movement responsive exhibiting element, link means connected to said elastic element for transmitting deformations of said elastic element to said mechanical movement responsive element, and a non-linear resistance element connected in parallel across the free terminals of said coil elements and whose resistance decreases with increasing value of current therethrough, said pairs of coil elements in said respective units being designed to produce respectively different magnitudes of mechanical movement responsive to a given value of current passing therethrough.

KARL BERGER.